United States Patent [19]

Nishijima

[11] 4,410,771
[45] Oct. 18, 1983

[54] TELEPHONE HANDSET RECEPTACLE FOR OFF-HOOK PLACEMENT

[76] Inventor: Victor Y. Nishijima, 336 W. 42nd Ave., San Mateo, Calif. 94403

[21] Appl. No.: 246,001

[22] Filed: Mar. 27, 1981

[51] Int. Cl.³ .......................................... H04M 1/04
[52] U.S. Cl. ............................................... 179/146 R
[58] Field of Search .................. 179/146 R, 178, 153, 179/6.01, 6.2, 1 C, 2 C

[56] References Cited

U.S. PATENT DOCUMENTS

| 2,339,413 | 1/1944 | King | 179/146 R |
| 3,085,134 | 4/1963 | Bissonnette et al. | 179/146 R |
| 3,150,239 | 9/1964 | Fielder | 179/146 R |
| 3,170,359 | 2/1965 | Mourra | 179/146 R X |
| 3,845,252 | 10/1974 | Wooters | 179/146 R |
| 4,326,102 | 4/1982 | Culp et al. | 179/2 C |

OTHER PUBLICATIONS

House Beautiful, Oct. 1973, p. 218, item Teledesk.

Primary Examiner—Stafford D. Schreyer
Attorney, Agent, or Firm—Willis E. Higgins

[57] ABSTRACT

This telephone handset receptacle has a base adapted to be mounted on a substantially vertical surface. At least one support member is spaced away from the base and extends upward when the base is mounted on the substantially vertical surface. The at least one support member is dimensioned and configured to engage the telephone handset so that the handset hangs from the receptacle. The base includes a means for fastening the receptacle to the substantially vertical surface. In its preferred form, the receptacle also includes a sound generation means activated by the presence of a telephone handset in the receptacle.

9 Claims, 8 Drawing Figures

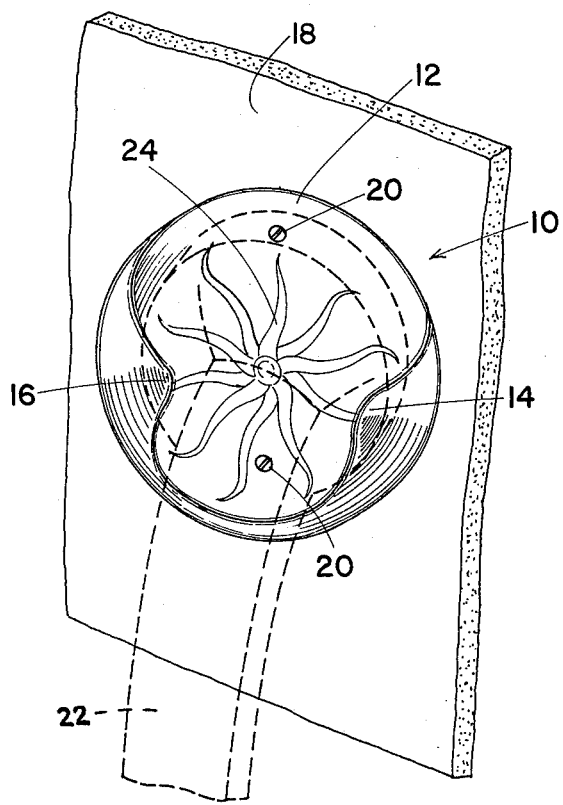
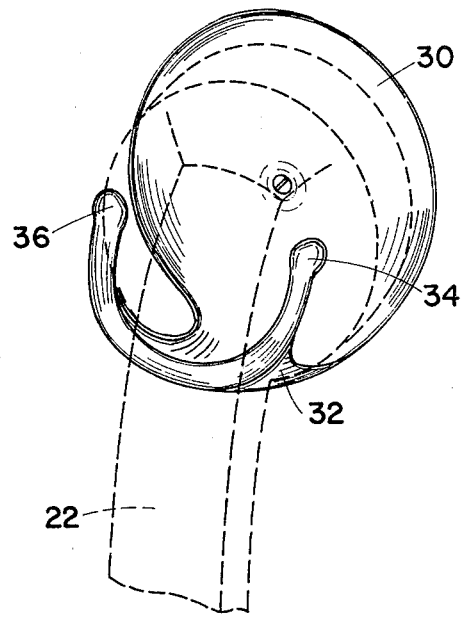
Fig. 1
Fig. 2
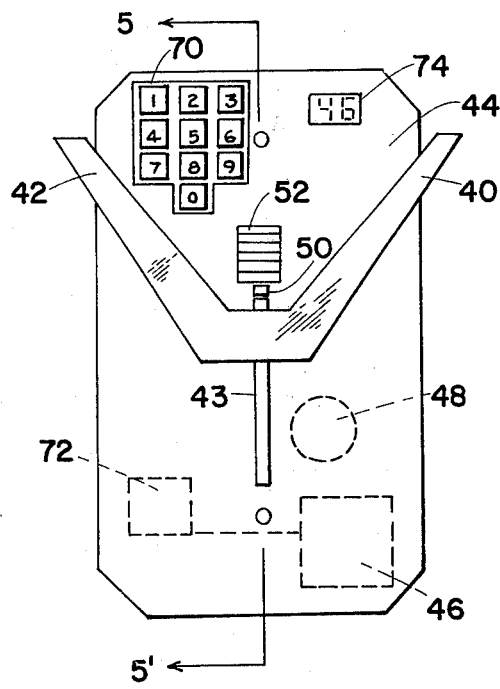
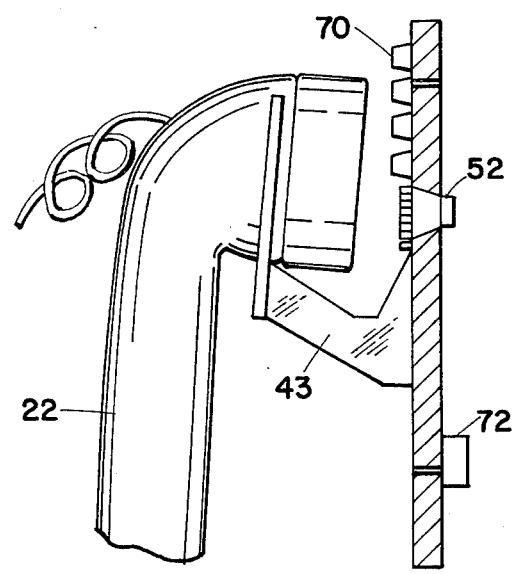
Fig. 3
Fig. 5

TELEPHONE HANDSET RECEPTACLE FOR OFF-HOOK PLACEMENT

BACKGROUND OF THE INVENTION

1. Field of the Invention

This invention relates to an improved receptacle for holding a telephone handset when it is off its switchhook. More particularly, it relates to such a telephone handset receptacle of improved convenience and simplified construction. Most especially, it relates to such a receptacle which will provide music to the waiting caller while the telephone handset is in the receptacle, and which provides a reminder to the user that the telephone handset is off its switchhook.

2. Description of the Prior Art

Interruptions which require a person talking on the telephone to leave the telephone, but during which it is not desired to disconnect the call, are common. With the conventional, basic telephone instrument, the telephone handset may not be replaced on its switchhook without disconnecting the call. Typically, telephones in business establishments have an accessory hold button which does allow the handset to be replaced on its switchhook without disconnecting the call. However, the added expense of this feature means that most residential telephones and some business telephones are not equipped with the hold feature. A few of such telephones have a surface on the console or base of the telephone on which the handset may be rested during such interruptions. However, the usual approach is to place the handset on a table or similar support during the interruption. However, the lack of a secure resting place for telephone handsets during such interruptions is a significant source of damage to the handsets and necessitates strengthening of them to minimize such damage.

Also, users occasionally forget that they have been interrupted in a telephone call and thus tie up telephone lines unnecessarily. Some telephone systems have special circuits for generating a noise through the handset to signal that a handset is off its hook after disconnection of the other end of the call and lapse of a predetermined period of time without hanging up the receiver. However, such signals are audible only within a short distance of the telephone receiver.

It is further known to provide recorded music over the telephone while the party at the other end of the line waits, known as the so-called "music on hold" feature. However, units to provide this feature are relatively expensive.

Thus, while the problem of securing a telephone handset during an interruption in a telephone conversation is a well recognized one, there remains a need for further improvement in approaches for handling this problem.

SUMMARY OF THE INVENTION

Accordingly, it is an object of this invention to provide an improved receptacle for holding a telephone handset conveniently and securely during an interruption in a telephone conversation.

It is another object of the invention to provide such a receptacle which will generate an audible sound while the telephone handset is in the receptacle.

It is yet another object of the invention to provide such a receptacle in which the audible sound may be heard by both parties to an interrupted telephone conversation.

It is still another object of the invention to provide such a telephone handset receptacle that may be easily fabricated at a low cost.

The attainment of these and related objects may be achieved through use of the novel telephone handset receptacle herein disclosed. This receptacle has a base adapted to be mounted on a substantially vertical surface. At least one support member spaced away from the base extends upward when the base is mounted on the substantially vertical surface. At least one support member is dimensioned and configured to engage the telephone handset so that the handset may be hangingly supported by the receptacle. There is a means for fastening the base to the substantially vertical surface.

In a preferred form, at least one support member is a pair of prong members which are each arcuate-shaped and are integrally formed with the base. The base may also incorporate a sound generating means and actuating means for the sound generating means, the actuating means being positioned to be engaged by the telephone handset when hung from the prong members. If the mouthpiece of the handset rather than the receiver is placed in the prongs, the generated sounds may be heard by the waiting party as well.

The attainment of the foregoing and related objects, advantages and features of the invention could be more readily apparent to those skilled in the art, after review of the following more detailed description of the invention, taken together with the drawings, in which:

BRIEF DESCRIPTION OF THE DRAWINGS

FIG. 1 is a perspective view of an embodiment of the invention;

FIGS. 2 through 4 are similar perspective views of other embodiments of the invention;

FIG. 5 is a cross-section view taken along the line 5—5 in FIG. 3, but showing the embodiment of FIG. 3 in use.

DETAILED DESCRIPTION OF THE INVENTION

Figure 4:
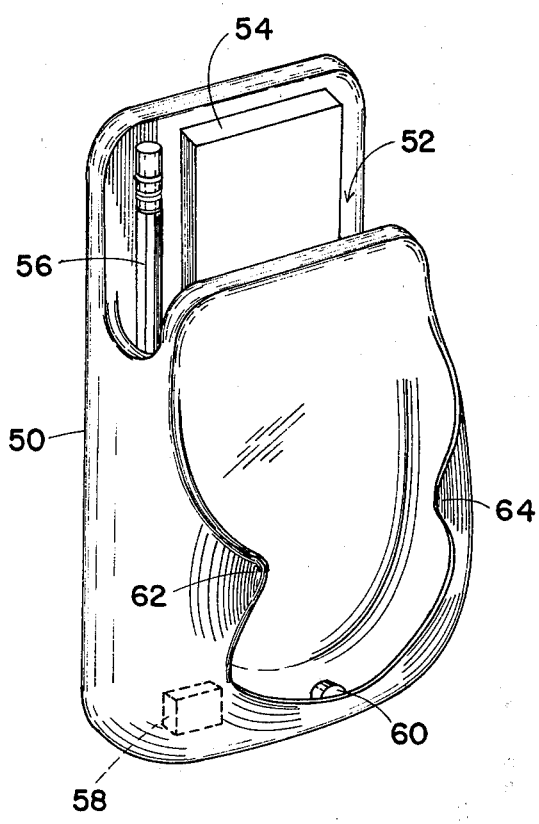

Turning now to the drawings, more particularly to FIG. 1, there is shown a telephone handset receptacle 10 in accordance with the invention. The receptacle 10 has a base 12 having a pair of upwardly extending projections 14 and 16 spaced away from the base 12, but integrally formed therewith. Base 12 is mounted on wall 18 or other suitable vertical surface by means of screws 20 or other suitable fastening means. The upwardly extending prongs 14 and 16 are dimensioned and configured so that the ear piece of a conventional telephone handset 22 is cradled between the prongs 14 and 16 and the base 12. The handset 22 is thus securely held by the receptacle 10 and hangs therefrom. The receptacle 10 may be fabricated of any suitable rigid material, but is preferably fabricated of plastic, such as high impact polystyrene, polyvinyl chloride, or the like. A design or similar ornamentation may be provided at, for example, 24 on the base 12.

FIG. 2 shows another embodiment of the invention, in which the base 30 has a pedestal 32 extending away from the base 30, and from which prong members 34 and 36 extend. The telephone handset 22 may then be supported by the prongs 34 and 36 as shown, in a manner similar to the support by prongs 14 and 16 in FIG. 1.

In the embodiment of FIG. 3, prongs 40 and 42 are supported by pedestal 43 and are of a somewhat different shape than in FIG. 2. This embodiment of the invention also includes a tone generation circuit 46 mounted in the base 44. The tone generation circuit 46 is typically implemented with any of various commercially available integrated circuits, and may be programmed or configured to produce a melody or other pleasing musical sounds, if desired. For example, the commercially available MM5555 chromatic frequency generator integrated circuit, obtainable from National Semiconductor Corporation, Santa Clara, Calif. 95051 may be used. A battery 48, desirably of the type conventionally employed to power electronic watches and similar small electronic units, is electrically connected to the tone generation circuit 46. A button 50 arranged to close a suitable switch when pressed is provided at the bottom of prongs 40 and 42, so that a telephone handset hung in the prong supports 40 and 42 will press the button 50. A small speaker 52 or other suitable sound transducer is also mounted in the base 44 and electrically connected to the tone generation circuit 46.

In the embodiment of FIG. 4, base 50 includes an enclosure 53 for a note pad 54 and pencil 56. Base 50 has a mechanical music box mechanism 58 mounted within it. A mechanical actuator 60 is also positioned on the base 50 and is mechanically coupled to the music box mechanism 58. The actuator 60 is positioned to be engaged by a telephone handset when the handset is hung from within prongs 62 and 64.

In the use with the embodiments of FIGS. 3 and 4, the mouthpiece, rather than the receiver, is placed between the prong supports 40 and 42 or 62 and 64, as shown in FIG. 5 for the FIG. 3 embodiment, so that musical sounds from the tone generation circuit 46 or music box 58 are transmitted via the mouthpiece to the waiting party, as well as being audible to the user who has placed the handset in the receptacle. If the tone generation circuit is programmable, a keypad 70 or similar selecting means is provided to select music for the waiting party from a list of songs stored in a read only memory (ROM) 72 electrically connected to the tone generation circuit 46. A liquid crystal or similar display 74 shows which program has been selected.

Figure 6:
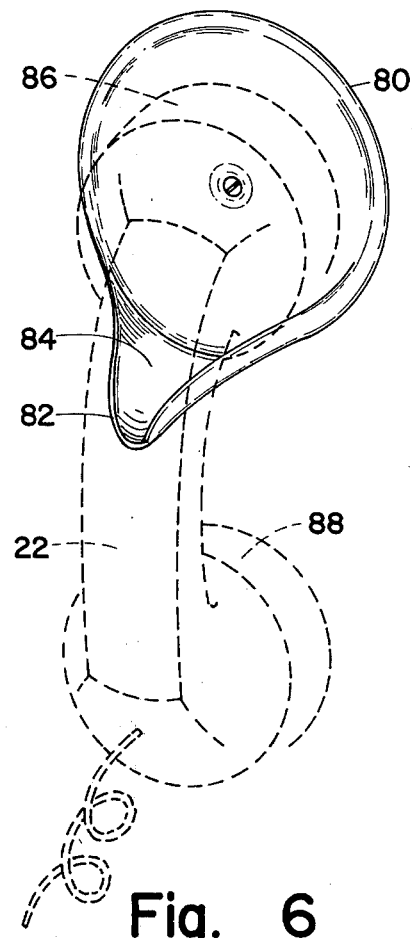
FIGS. 6 through 8 are perspective views of additional embodiments of the invention.
Figure 7:
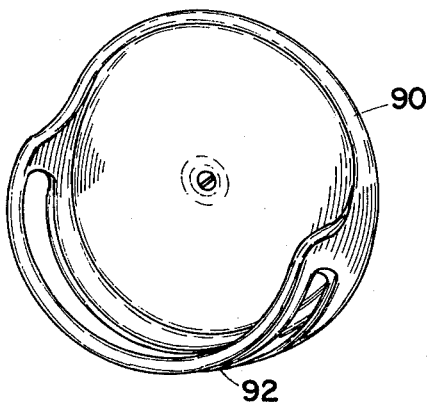
Figure 8:
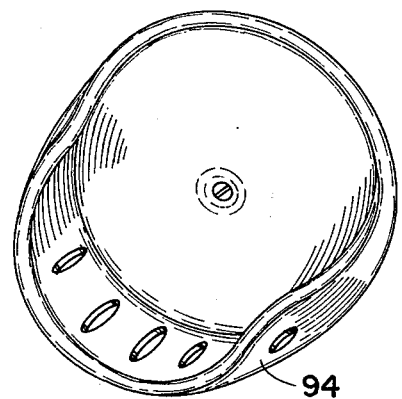

FIGS. 6 through 8 show additional embodiments of the invention, in which a single support for the telephone handset is employed. In FIG. 6, the base 80 has a prong 82 extending outward from the bottom of base 80, as shown. Surface 84 of the prong has a concave configuration, into which the receiver 86 or mouthpiece 88 of telephone handset 22 fits, with the neck of the handset 22 extending over prong 82.

In the FIG. 7 embodiment, base 90 has a cup-shaped support member 92, into which the receiver or mouthpiece of the telephone handset may be inserted. A similar cup-shaped support member 94 is provided in the embodiment of FIG. 8.

It should now be apparent to those skilled in the art that a novel telephone handset receptacle capable of achieving the stated objects of the invention has been provided. A receptacle in accordance with this invention is easily fabricated of plastic or other suitable material in a one piece, integral construction. The receptacle holds a conventional telephone handset in a highly convenient and reliable manner. In its preferred form, the receptacle also incorporates a sound generation means, activated by the presence of the handset in the receptacle, for reminding a user that the handset has been placed in the receptacle, and simultaneously providing music or other sounds to the waiting party on the other end of the line.

It should further be apparent to those skilled in the art that various changes in the form and details of the invention as shown and described may be made. For example, one or more of the additional features in the FIGS. 3-5 embodiments can be incorporated into receptacles having the forms of FIGS. 1-2 and 6-8.

What is claimed is:

1. A receptacle for a telephone handset, for use adjacent to a telephone, which comprises:
   a base having a curved edge and at least one aperture for a fastening means passing through said base for mounting said base on a substantially vertical surface, and
   a pair of curved, arcuate, opposed extensions integrally formed with the curved edge of said base, said extensions being dimensioned and configured to engage the telephone handset so that the handset may be hangingly supported by said receptacle, and
   an enclosure for a note pad formed by substantially rectangular portions of said base.

2. The receptacle of claim 1 additionally comprising a sound generating means in said base and an actuating means for said sound generating means, said actuating means being positioned to be engaged by the telephone handset when hung from said receptacle.

3. The receptacle of claim 2 in which said sound generating means comprises a musical tone generation circuit and a sound transducer electrically connected to said sound transducer.

4. The receptacle of claim 3 in which said tone generation circuit is programmable, said receptacle further including memory means electrically connected to said musical tone generation circuit for storing a plurality of programs for said musical tone generation circuit, and a means on said base for selecting from among the plurality of programs.

5. The receptacle of claim 4 additionally comprising a display means for indicating a selected program.

6. A receptacle for a telephone handset, for use adjacent to a telephone, which comprises a base having at least one aperture extending through said base for a fastening means passing through said base for mounting said base on a substantially vertical surface, said base incorporating a programmable musical tone generation circuit, a sound transducer electrically connected to said musical tone generation circuit, memory means electrically connected to said musical tone generation circuit for storing a plurality of programs for said tone generation circuit, a means on said base for selection from among the plurality of programs, and at least one telephone handset support member extending away from said base, said telephone handset support member being dimensioned, configured and positioned to support a mouthpiece of the telephone handset opposite said sound transducer, so that musical tones generated by said sound transducer are audible to a caller while the handset is so supported by said support member.

7. The receptacle of claim 6 additionally comprising a display means for indicating a selected program.

8. A receptacle for a telephone handset, for use adjacent to a telephone, which comprises:

a curved edge base having at least one aperture for a fastening means passing through said base for mounting said base on a substantially vertical surface, a pair of curved, arcuate, opposed extensions integrally formed with the curved edge of said base, said extensions being dimensioned and configured to engage the telephone handset so that the handset may be hangingly supported by said receptacle, a programmable musical tone generation circuit in said base, an actuating means for said musical tone generation in said base, said actuating means being positioned to be engaged by the telephone handset when hung from said receptacle, a sound transducer electrically connected to said musical tone generation circuit, memory means electrically connected to said musical tone generation circuit for storing a plurality of programs for said musical tone generation circuit, and a means on said base for selecting from among the plurality of programs.

9. A receptacle of claim 8 additionally comprising a display means for indicating a selected program.

* * * * *